US009946060B2

(12) United States Patent
Hartell (10) Patent No.: US 9,946,060 B2
(45) Date of Patent: Apr. 17, 2018

(54) SUPER-RESOLUTION MICROSCOPY (71) Applicant: University of Leicester, Leicester (GB)

(72) Inventor: Nicholas Anthony Hartell, Letchworth Garden (GB)

(73) Assignee: University of Leicester, The, Leicester (GB)

( * ) Notice: Subject to any disclaimer, the term of this patent is extended or adjusted under 35 U.S.C. 154(b) by 0 days.

(21) Appl. No.: 15/030,850

(22) PCT Filed: Oct. 21, 2014

(86) PCT No.: PCT/GB2014/053137
§ 371 (c)(1),
(2) Date: Apr. 20, 2016

(87) PCT Pub. No.: WO2015/059462
PCT Pub. Date: Apr. 30, 2015

(65) Prior Publication Data
US 2016/0252718 A1    Sep. 1, 2016

(30) Foreign Application Priority Data
Oct. 21, 2013  (GB) .................................. 1318598.8

(51) Int. Cl.
*G06K 9/32*    (2006.01)
*G02B 21/36*   (2006.01)
(Continued)

(52) U.S. Cl.
CPC ........... *G02B 21/367* (2013.01); *G02B 21/06* (2013.01); *G02B 21/361* (2013.01); *G02B 27/58* (2013.01)

(58) Field of Classification Search
CPC ...... G02B 21/367; G02B 21/06; G02B 27/58; G02B 2207/113; G01N 21/6458;
(Continued)

(56) References Cited

U.S. PATENT DOCUMENTS 8,416,818 B2 *   4/2013  Bouma ................ A61B 5/0059
                                                    372/20
8,570,650 B2 *  10/2013  Dougherty .......... G01N 21/6458
                                                    359/368
(Continued)

FOREIGN PATENT DOCUMENTS

WO   WO 2004/005895 A1   1/2004
WO   WO 2011/090710 A2   7/2011
(Continued)

OTHER PUBLICATIONS

UK Intellectual Property Office Search Report for Application No. GB1318598.8 dated Apr. 14, 2014.
(Continued)

*Primary Examiner* — Ali Bayat
(74) *Attorney, Agent, or Firm* — Leydig, Voit & Mayer, LTD.

(57) ABSTRACT

The present invention relates to a method of processing images captured following structured illumination of a sample, the method comprising the steps of: identifying emission spots within each captured image; verifying the emission spots; and reconstructing an enhanced image of the sample from the emission spots. The method may comprise identifying only in focus emission spots. By identifying and processing only in focus spots, whether or not they are centered on expected illumination positions, improvements in resolution can be achieved compared to known SIM methods. In particular, by suitable selection of in focus spots, significant improvements in lateral and axial resolution can be achieved.

21 Claims, 7 Drawing Sheets (51) Int. Cl.
*G02B 27/58* (2006.01)
*G02B 21/06* (2006.01)

(58) Field of Classification Search
CPC ...... G01N 21/35; A61B 18/20; G06T 3/4053; G06T 2207/20224
See application file for complete search history.

(56) References Cited

U.S. PATENT DOCUMENTS

| | | | | |
|---|---|---|---|---|
| 9,213,176 | B2* | 12/2015 | Pertsinidis | G02B 21/18 |
| 2015/0015879 | A1* | 1/2015 | Papadopoulos | G02B 23/26 356/301 |
| 2016/0238827 | A1* | 8/2016 | Shroff | G02B 21/0032 |

FOREIGN PATENT DOCUMENTS

| WO | WO 2013/067643 A1 | 5/2013 |
|---|---|---|
| WO | WO 2013/126762 A1 | 8/2013 |

OTHER PUBLICATIONS

International Search Report for Application No. PCT/GB2014053137, dated Oct. 21, 2013.
Abbe, E. Beitrage zur Theorie des Mikroskops und der mikroskopischen Wahrnehmung. Arch. f. Mikroskop. Anat. 9, 413-468 (1873).
Betzig, E. et al. Imaging intracellular fluorescent proteins at nanometer resolution. Science 313, 1642-1645 (2006).
Hess, S.T., Girirajan, T.P. & Mason, M.D. Ultra-high resolution imaging by fluorescence photoactivation localization microscopy. Biophys J 91, 4258-4272 (2006).
Rust, M.J., Bates, M. & Zhuang, X. Sub-diffraction-limit imaging by stochastic optical reconstruction microscopy (STORM). Nat Methods 3, 793-795 (2006).
Jones, S.A., Shim, S.H., He, J. & Zhuang, X. Fast, three-dimensional super-resolution imaging of live cells. Nat Methods 8, 499-508 (2011).
Hell, S.W. & Wichmann, J. Breaking the diffraction resolution limit by stimulated emission: stimulated-emission-depletion fluorescence microscopy. Opt Lett 19, 780-782 (1994).
Ding, J.B., Takasaki, K.T. & Sabatini, B.L. Supraresolution imaging in brain slices using stimulated-emission depletion two-photon laser scanning microscopy. Neuron 63, 429-437 (2009).
Gustafsson, M.G. Surpassing the lateral resolution limit by a factor of two using structured illumination microscopy. Journal of microscopy 198, 82-87 (2000).
York, A.G. et al. Resolution doubling in live, multicellular organisms via multifocal structured illumination microscopy. Nat Methods 9, 749-754 (2012).
Serge, A., Bertaux, N., Rigneault, H. & Marguet, D. Dynamic multiple-target tracing to probe spatiotemporal cartography of cell membranes. Nat Methods 5, 687-694 (2008).
Dedecker, P., Duwe, S., Neely, R. K. & Zhang, J. Localizer: fast, accurate, open-source, and modular software package for super-resolution microscopy. Journal of biomedical optics 17, 126008 (2012).
David Baddeley et al: "Visualization of Localization Microscopy Data", Microscopy and Microanalysis, Springer, New York, NY, US, vol. 16, No. 1, Jan. 18, 2010 (Jan. 18, 2010), pp. 64-72, XP001551515, ISSN: 1431-9276, DOI: 10.1017/5143192760999122X D3.
Erana Mukamel et al: "Statistical Deconvolution for Superresolution Fluorescence Microscopy", Biophysical Journal, Cell Press, US, vol. 102, No. 1 O, Mar. 20, 2012 (Mar. 20, 2012), pp. 2391-2400, XP028488206, ISSN: 0006-3495, DOI: 10.1016/J.BPJ.2012.03.070 [retrieved on Apr. 4, 2012].
Y Kremer et al: "A spatio-temporally compensated acoustooptic scanner for two-photon microscopy providing large field of view. References and Links", Opt. Lett. Opt. Lett. Opt. Lett. Rev. Sci. Instrum. 13 .. Opt. Opt. Commun. Osa Opt. Express Opt. Lett. Opt. Express Opt. Express, vol. 33, No. 19, Jul. 7, 2008 (Jul. 7, 2008), pp. 128-130, XP055181712.

\* cited by examiner

SUPER-RESOLUTION MICROSCOPY

TECHNICAL FIELD OF THE INVENTION

The present invention relates to improvements in or relating to super-resolution microscopy, in particular to structured illumination microscopy (SIM), and most particularly to an improved method of processing images generated by SIM.

BACKGROUND TO THE INVENTION

Recent developments in microscopy have led to significant improvements in spatial resolution beyond those predicted by the apparent diffraction limit [1]. New technologies have led to enhancements in acquisition speed and the introduction of multiphoton microscopy and other new microscopy techniques allows imaging of structures deep within tissues. Bringing all these advances together to produce high-speed super-resolution imaging, deep in tissue is therefore an attractive prospect. Super-resolution imaging and super-resolution definition may be described as a series of techniques that enable the capture of images with a higher resolution than the applicable diffraction limit (due to the diffraction of light/electromagnetic radiation (EMR), the resolution of conventional microscopy is limited, as stated by Abbe (1873).)

Of all of the super-resolution techniques so far described stochastic imaging approaches such as photoactivated localization microscopy (PALM) [2] and stochastic optical reconstruction microscopy (STORM) [3, 4] provide the best improvements in spatial resolution. These, and numerous related techniques, rely on the principle that only a subset of fluorophores are active at any one time allowing their positions to be localised with a high degree of accuracy. Each single molecule is identified, localised with high precision, deconvolved and a super-resolution image reconstructed. Whilst speeds of up to 0.5 frames per second have been reported in live cells [5], these methods are generally very slow and more commonly used for fixed specimens.

Stimulated emission depletion (STED) also achieves sub-diffraction limited resolution and, being significantly faster than stochastic approaches, it has the potential to be useful for dynamic imaging [6]. In brain slices, for example, a three-fold improvement in lateral resolution has been achieved with a 2-photon laser-scanning microscope reaching speeds of around 4 frames per second for a small area of 128×128 pixels or 1 frame per second at 512×512 pixels 7. Standard methods of STED do not, however, lead to any improvement in axial resolution. This is a significant drawback with multiphoton imaging since the axial sectioning ability is significantly lower than that of confocal microscopy.

Structured illumination microscopy (SIM) realises a more modest (<two-fold) increase in resolution [8] but it has recently been adapted for relatively high speed optical sectioning of live specimens [9]. In SIM, patterns of light that vary in orientation and phase are used to successively excite a sample. An increase in resolution is achieved from the interference of the illumination patterns and the sample fluorescence by appropriate image processing.

One recent implementation of SIM involves scanning points of sparse illumination over the specimen with a programmable illumination device such as a digital micro-mirror so that over a given period of time, the entire specimen is illuminated. A camera is used to detect the light emitted by the specimen. Subsequently, a sequence of images from the camera can be used to produce high-resolution, optically sectioned images. The particular technique described in [9] provides for improvements in speed and resolution over previous techniques. This technique relies on the individual points of illumination at any one time being located, well separated, and using the camera pixels as "digital pinholes". Each image in a sequence can be processed to produce high-resolution, optically sectioned images at speeds of around 11 frames per second. In particular, this technique relies on determining the position of illumination points within the detected images. Smaller subimages of a preset diameter centred on these positions are then extracted. The subimages are subsequently enhanced (multiplied by a 2D Gaussian mask) and re-centred on the expected illumination points. This digitally simulates the effect of a pinhole at each expected illumination position. By rejecting potentially out of focus emissions from other positions within the detected images, a composite image produced from a sequence of images can provide improved resolution.

The above method does however have some drawbacks. In particular, this technique ignores potentially in focus spots from locations other than the expected illumination points reducing the potential information being processed. The technique also relies upon identification of the precise illumination points on the camera prior to imaging a sample and hence long-term measurements are susceptible to movement of the equipment and drift over time. Additionally, extracting subimages of a preset diameter at each expected illumination position means that both in focus and out of focus emission spots are used in generating the final image.

It is therefore an object of the present invention to provide improvements in or relating to super-resolution microscopy and in particular to improvements in or relating to processing images produced by structured illumination microscopy, such as structured illumination in the infra-red to x-ray spectra.

SUMMARY OF THE INVENTION

According to a first aspect of the present invention there is provided a method of processing images captured following structured illumination of a sample, the method comprising the steps of: identifying emission spots within each captured image; verifying the emission spots; and reconstructing an enhanced image of the sample from the emission spots.

Preferably the method comprises the steps of: identifying emission spots within each captured image; determining the centre of each identified spot; extracting a subimage concentric with each identified spot; enhancing each subimage; replacing the extracted subimages with the enhanced subimages; and generating an enhanced image comprising the enhanced subimages.

In some embodiments the method comprises the steps used in other forms of super-resolution microscopy such as PALM, STORM and super-resolution optical fluctuation imaging (SOFI), for example.

The method may include the step of selecting emission spots in a desired wavelength range. In some embodiments, there may be a single emission wavelength range. In alternative embodiments, there may be two or more wavelength ranges.

The method may comprise the steps of only identifying and processing in focus spots, whether or not they are centred on expected illumination positions, and therefore improvements in resolution can be achieved compared to known SIM methods. In particular, by suitable selection of in focus spots, significant improvements in axial resolution can be achieved. Emission spots may be identified using any suitable localisation method including but not limited to those adapted for use with stochastic imaging approaches such as PALM and STORM as well as localisation routines derived for particle tracking. The choice of method will be dependent on the density of the spacing of the data obtained. In some embodiments emission spots may be located through the method of iteratively fitting multiple point spread functions (PSFs) to regions of image data which appear to contain overlapping signals. In other embodiments the emission spots may be located using compressed sensing comprising the steps of: extracting emission spot co-ordinates from potentially overlapping image data by first calculating the expected image from each possible emission spot position; and determining the emission spot positions that give rise to real signals in light of this complete prior knowledge. Emission spots may be located using the method used in Bayesian Localization Microscopy which optimizes a model of fluorophore density to fit the fluorescence measurements made in a whole series of images. In a preferred implementation, spots may be identified using a generalised likelihood ratio test (GLRT) segmentation method based on spot diameter and signal to noise ratio. The GLRT threshold may be adjusted iteratively.

Emission spots may be identified if their diameters match the diameter of the expected PSF of the collection optics. The expected PSF may be calculated or may be determined by experiment. Spots may be determined to have diameters that match the expected PSF if they are equal to the expected diameter or vary from the expected diameter by less than a threshold value. The threshold value may be based on the expected standard deviation of the PSF. The threshold value may be adjusted iteratively.

The method may include the further step of selecting the axial focus of the images by suitably selecting the PSF diameter and/or threshold value.

The centre of each identified spot may be located using any suitable method including but not limited to those used for particle localisation and tracking and stochastic super-resolution imaging approaches such as PALM/STORM and SOFI. In one preferred implementation, the centre of each identified spot may be determined by using nonlinear curve fitting of a symmetric Gaussian function with a fixed standard deviation. The standard deviation value may be fixed based on estimation or may be fixed based on an average value determined from identified spots.

Enhancing each image or subimages may be carried out by any suitable technique including but not limited to those developed for SIM, PALM, STORM and SOFI. In one preferred implementation, enhancement is carried out using a Gaussian mask. The Gaussian mask may have a fixed or user defined standard deviation. Enhancement may additionally or alternatively include scaling the subimage. In a preferred embodiment a scale factor of the order 2 may be applied to the subimage.

The method may include the further step of generating a composite image from a sequence of enhanced images. A composite image may be generated by calculating a 2D histogram of the emission spot positions with a chosen square bin size, which may correspond to the pixel size of the composite image. This may then be displayed as a pixelated image whose local intensity is proportional to the bin occupancy. In some embodiments the composite image may be formed of a Quad-Tree Based Adaptive Histogram based on a quad-tree representation of the localization data.

In other embodiments the composite image may be formed using a triangulation technique such as Delaunay Triangulation Based Visualization, for example. Subsequent processing steps including deconvolution approaches including but not limited to Lucy-Richardson deconvolution may also be applied.

The method may include the additional steps of generating composite images under differing conditions and comparing said composite images. This can allow active sites or sites responsive to the variation in conditions between the composite images to be identified. The comparison may take the form of a subtraction of one composite image from another. The differing conditions may include variations in temperature, chemical exposure, electrical or magnetic stimulation or the like.

The method may include the steps of monitoring temporal variation in one or more locations within an imaged area. This may be achieved by comparing emission spots at said selected locations over the sequence of images used to generate a composite image. Where composite images generated under differing conditions are compared, the method may involve comparing images used to generate the composite images. This can enable temporal variations caused by the differing conditions to be monitored.

According to a second aspect of the present invention there is provided a super-resolution imaging technique comprising the steps of: selectively illuminating a series of separated points of a specimen; capturing images resulting from said illumination; and processing said images according to the method of the first aspect of the present invention.

The separated points of the specimen may be sparsely separated points.

The method of the second aspect of the present invention may incorporate any or all features of the method of the first aspect of the present invention as desired or as appropriate. The illuminated points may be provided over an imaging area. The imaging area may have any desired shape. In particular, the shape may be simple, regular, irregular or complex as required or as desired. In some embodiments, the shape of the imaging area may be determined by the known or suspected shape of areas of interest within the specimen. The illuminated points may be arranged according to any suitable pattern. Preferably, the illuminated spots are arranged according to a grid pattern, which may be any polygonal pattern such as a square grid pattern or a triangular grid pattern, for example. The spot separation within the pattern may be determined iteratively. Alternatively, the illuminated spots may be arranged without a regular pattern.

The illumination may be substantially monochromatic. In alternative embodiments, the illumination may comprise two or more wavelengths.

Preferably each illumination pattern is used to generate an enhanced image. Preferably, the method includes the further step of generating a composite image from a sequence of enhanced images. The number of images in the sequence may be determined by the number of illuminated points in each pattern. In particular, the number of images in the sequence may be related to the number of illumination points in an illumination pattern. For a grid pattern, the number of images in the sequence may be the square of number of rasters required to illuminate the entire pattern.

According to a third aspect of the present invention there is provided a super-resolution multi photon imaging technique comprising the steps of: selectively illuminating a series of separated points of a specimen; capturing images resulting from said illumination; and processing said images according to the method of the first aspect of the present invention.

The method of the third aspect of the present invention may incorporate any or all features of the method of the first or second aspect of the present invention as desired or as appropriate.

According to a fourth aspect of the present invention, there is provided an apparatus for super-resolution imaging, the apparatus comprising: a programmable illumination arrangement operable to selectively illuminate a series of separated points of a specimen; a detection arrangement operable to capture images resulting from said illumination; and processing means operable to process captured images according to the method of the first aspect of the present invention.

The apparatus of the fourth aspect of the present invention may incorporate any or all features of the methods of the first, second or third aspects of the present invention as desired or as appropriate and may be a an apparatus for super-resolution multi-photon imaging.

The programmable illumination arrangement may comprise a source of electromagnetic radiation and beam steering means. The wavelength of the electromagnetic radiation may be in the infra-red to x-ray range, such as infra-red, visible, ultra-violet or x-ray radiation. In preferred embodiments the EMR is in the infra-red, visible or ultra-violet spectra. The EMR source may be a continuous or pulsed emission source. In some embodiments the electromagnetic radiation is provided by an LED. In other embodiments the source of electromagnetic radiation may comprise a laser. The laser may comprise any type of laser such as a pulsed laser or a tunable laser, for example.

The illumination arrangement may be operable to illuminate the specimen substantially monochromatically. Alternatively, the illumination arrangement may be operable to illuminate the specimen using two or more wavelengths.

It may be possible to utilise an EMR source outside the infra-red to x-ray spectra provided that the EMR is delivered to the specimen in a structured fashion and gives off a detectable signal during processing; for example radio waves, microwaves and gamma rays.

The beam steering means may take any suitable forms including but not limited to digital micro-mirror or liquid crystal on silicon (LCOS) programmable arrays or galvanometric mirrors. In a preferred embodiment, the beam steering means may comprise acousto-optic deflectors (AODs). In such embodiments, compensation means may be provided to compensate for the spatial and temporal disruption of laser pulses caused by AODs. In a preferred embodiment, the compensation means comprises an acousto-optic modulator (AOM).

The detection arrangement may comprise a suitable device including but not limited to CCD, CMOS or sCMOS cameras or an array of photodetectors. In a preferred embodiment, the detection arrangement comprises a CCD or sCMOS camera.

The detection arrangement may be operable to select emission spots in a single desired wavelength range or in two or more wavelength ranges. Where there are two or more wavelength ranges, desired wavelengths may be selected by filtering or by an emission splitter.

DETAILED DESCRIPTION OF THE INVENTION

In order that the invention may be more clearly understood an embodiment thereof will now be described, by way of example only, with reference to the accompanying drawings, of which.

Figure 1:
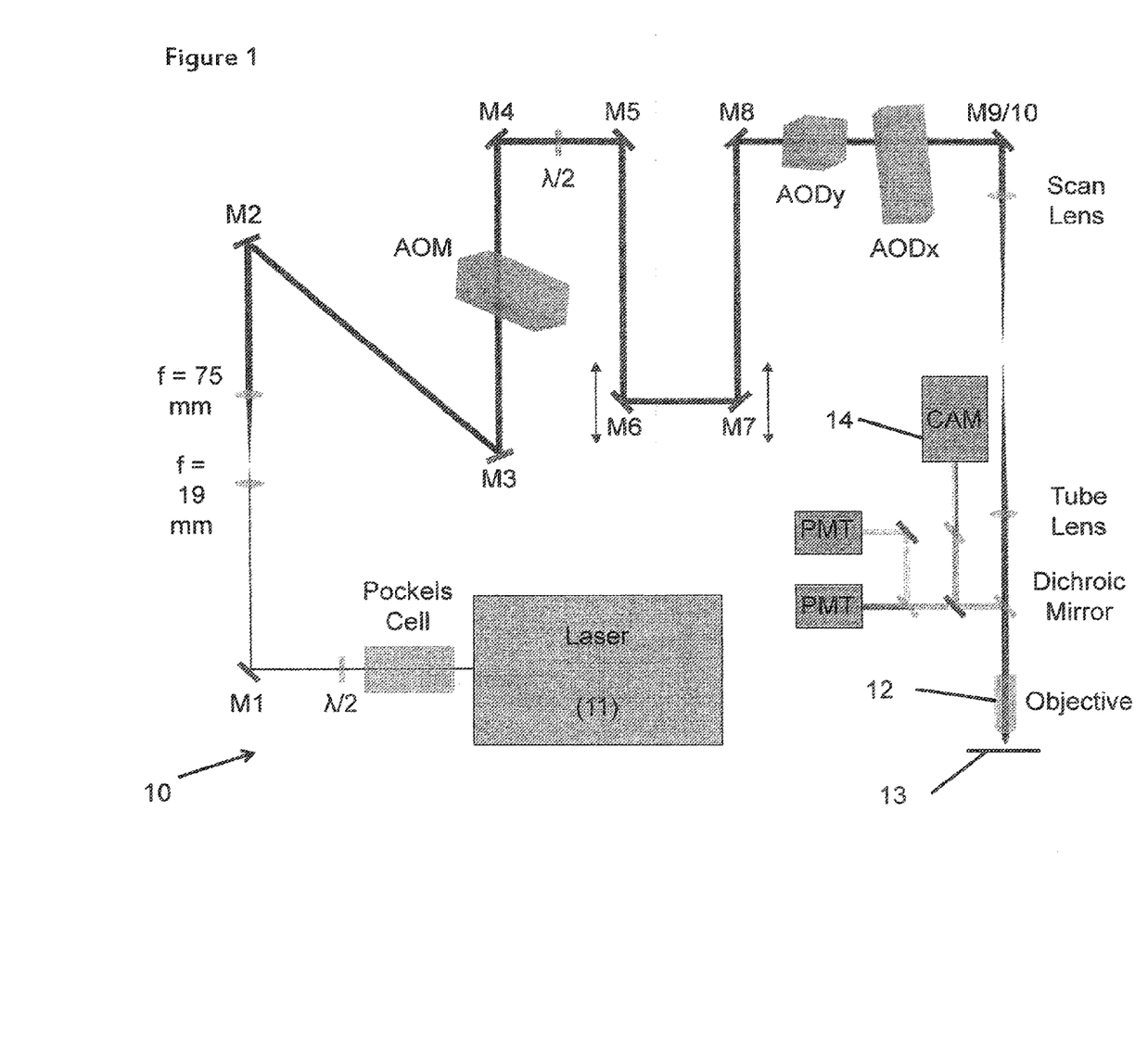
FIG. 1 shows a schematic illustration of an apparatus for structured illumination microscopy (SIM) suitable for use in the present invention.

Turning to FIG. 1, an apparatus 10 for structured illumination microscopy (SIM) is shown. The apparatus comprises a pulsed femtosecond Mi Tai laser 11 operable to generate a series of laser pulses. The laser pulses are directed on to a specimen 12 via an optical arrangement comprising achromatic half-wave plate $\lambda/2$; plain mirrors M1-M10; tube lens TL and objective microscope 13. The laser pulses are steered by a pair of acousto-optic deflectors AODx, AODy so as to sequentially illuminate a series of sparsely separated points on to a specimen 12, the illumination points typically being arranged in an n×n grid pattern. Nevertheless, it is possible for alternative illumination patterns to simple grids. It is also possible that the illumination area can have a regular, complex or irregular shape as required or desired.

In order to compensate for temporal and spatial dispersion of the laser pulses, an acousto-optic modulator AOM is provided within the optical arrangement. The arrangement may optionally have additional compensation optics to correct for temporal and spatial dispersion of the laser beam.

As a result of the illumination, the specimen will emit light which is collected by the microscope objective 13 and directed to image sensors including photomultiplier tubes PMT and a camera 14. In the present example, the camera is a sCMOS camera, but the skilled man will appreciate that alternative cameras or detectors may be used if appropriate. The Photomultiplier tubes PMT allow the apparatus to be utilised for alternative detection modes other than those according to the present invention.

The camera 14 is operable to capture a series of images, each image of the emission resulting from one illumination of the illumination pattern. In use, the AODs are used to scan sequences of sparsely separated points in a grid pattern. The camera 14 is operable to capture an image of the emission resulting from one illumination of the grid pattern. The grid is then shifted sequentially and a further image captured, so that the entire field of view is eventually covered. In the present invention each image in the sequence is processed according to the method described with respect to FIG. 2 to generate an enhanced image. A sequence of enhanced images is then combined to generate a composite image. For an n×n grid requiring the laser beam to be rastered p times to complete the illumination, a stack of $p^2$ images required to be processed to generate a composite image. For example, a grid with 16 points on each axis required $16^2$=256 separate frames for one super-resolution image.

Figure 2:
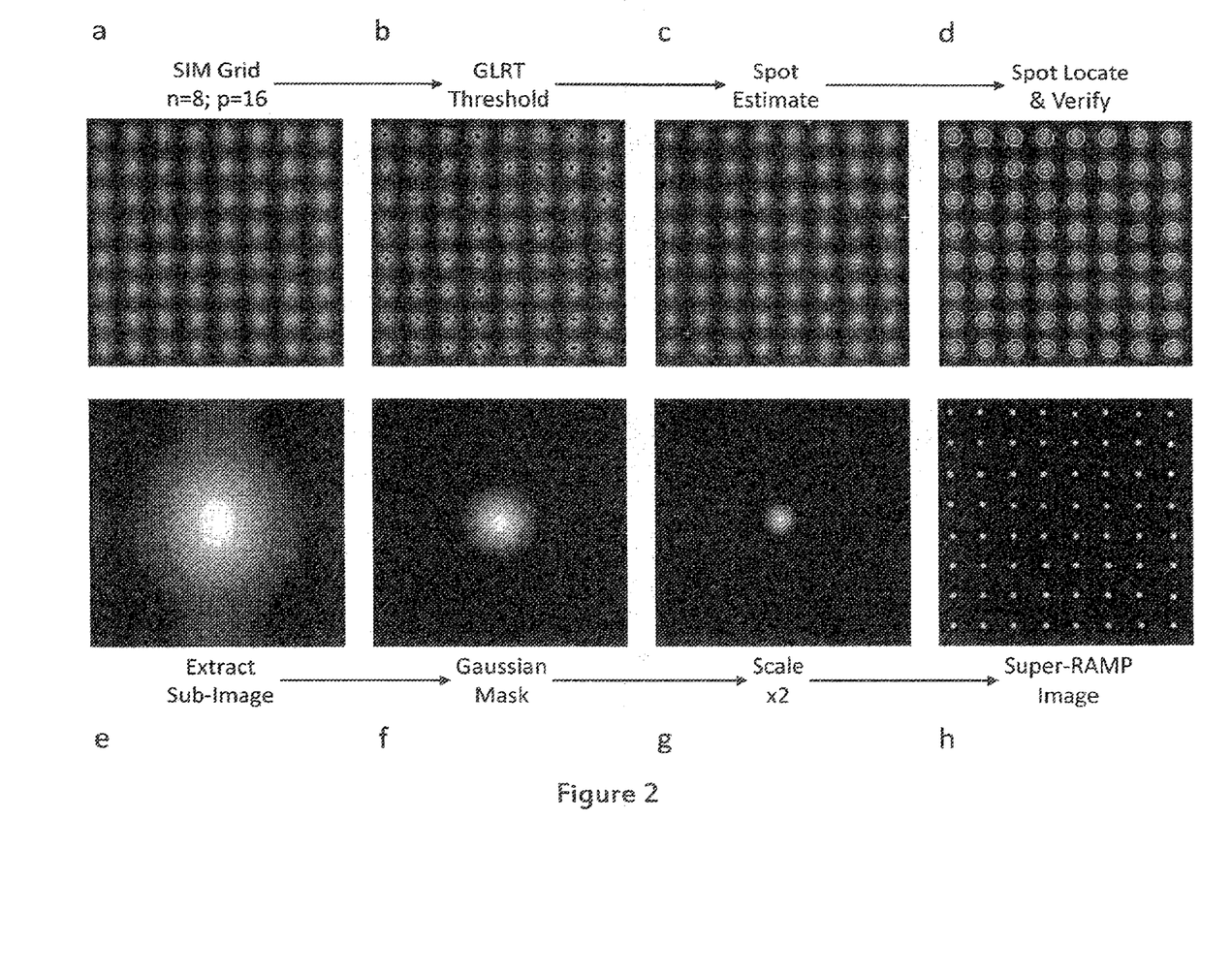
FIGS. 2*a*-2*h* illustrate the application of the processing technique of the present invention to a an image of a uniformly fluorescent sample acquired using SIM.

Turning now to FIG. 2, this illustrates the method applied to a single image resulting from a single illumination of a uniformly fluorescent specimen 12 using an 8×8 grid. In FIG. 2a, the captured image comprises a grid of 8×8 emission spots. Spots can be identified and located using one of several algorithms previously developed for stochastic or fluctuation analysis based super-resolution methods [10]. A number of such algorithms are contained in a package developed for use in Igor Pro called Localizer [11].

Light from a diffraction-limited point source will form a spot with a 2D Gaussian distribution with a point-spread function (PSF) defined by the optics of the microscope. If the PSF of the microscope is known, then light that originates from the point of focus will have a known diameter and this can be used to inform the spot identification routine to identify light that is precisely in focus and discard light that is not. Spots that do not satisfy the requirement of these routines are excluded from further processing. By varying the diameter of the PSF used above, the present process can effectively vary the axial resolution of the images.

In particular, a generalized likelihood ratio test (GLRT) is used to identify spots having a signal to noise ratio above a threshold level (FIG. 2b) and an estimate of the standard deviation of the PSF of the microscope 13 (PSF SD) is used to identify spots (FIG. 2d) that are in focus.

In more detail, spot identification may be performed according to methods adapted from Serge et al., (2008), using a two-dimensional Gaussian approximating the PSF of the microscope. An optimal detection test, such as a generalized likelihood ratio test (GLRT) is first applied to identify Gaussian peaks in each image. The image intensity is analysed in a sliding window in which the respective probabilities of particle presence (H1) or absence (H0) are compared, taking into account the image noise: targets are identified by the H1/H0 ratio. This ratio is high when peaks are significantly separated from noise. Two parameters are required for detection of peaks. These are a window size of n×n pixels and a false alarm rate (PFApeak). The window size should be optimised to ensure a correct estimation of the background while limiting possible long-range background variations. The accuracy of the decision is set by fixing a constant false alarm rate. The PFApeak is independent of the intensity and background, and consequently of the experimental image acquisitions.

Following this initial binary identification, the intensity, subpixel position, width and offset of identified spots can then need to be estimated (FIG. 2c). One of several methods can be used. A particularly suitable method is the use of nonlinear curve fitting of a symmetric Gaussian, with a fixed standard deviation. Various filtering tests can be used to remove putative aberrant points. Such methods allow the centre of the spot to be identified with a high degree of accuracy allowing further processing to improve the lateral (xy) resolution.

The advantage of this algorithm based detection approach is that it is not necessary to know the precise location of each spot in advance. The disadvantage is that the method may miss weakly fluorescent spots that are still in focus. In such cases, it is possible to use the coordinates of spots previously located using a uniformly fluorescent sample or to predict the position of weakly fluorescent spots.

The centre coordinates for each spot are used to generate a sub-image (FIG. 2e) concentric with each identified spot. To each subimage is then applied a digital pinhole in the form of a two dimensional Gaussian mask of known standard deviation (FIG. 2f). Subsequent to the application of the Gaussian mask, each subimage is scaled by a factor of two (FIG. 2g). The subimages are then placed back into a blank image at their original centre coordinates (FIG. 2h) to provide an enhanced image. Combining a series of enhanced images allows a composite super-resolution image to be generated.

Three key parameters were used to define the final image. The GLRT threshold and an estimate of the standard deviation of the PSF of the microscope 13 (PSF SD) were used to identify and locate spots. The PSF SD was generally the same for a particular objective and spot separation although this parameter may be iteratively adjusted along with the GLRT threshold to optimise spot detection. Spot separation was crucial. Reducing the distance between spots in a single frame allows fewer frames per Super-RAMP image: if the spots are too close together, they cannot be easily resolved; and if the spots are too far apart, then the improvement in single point resolution leaves the final image granular with gaps between points. The ideal spot separation may be found iteratively to ensure good identification and reduced granularity. The third key parameter that defines the final image quality is the standard deviation of the 2D Gaussian mask which defines the size of the "digital pinhole" and hence the resolution of the final image. Decreasing the value of the standard deviation enhances spot resolution but can lead to granularity of the final images if the spot separation is too large.

Figure 3:
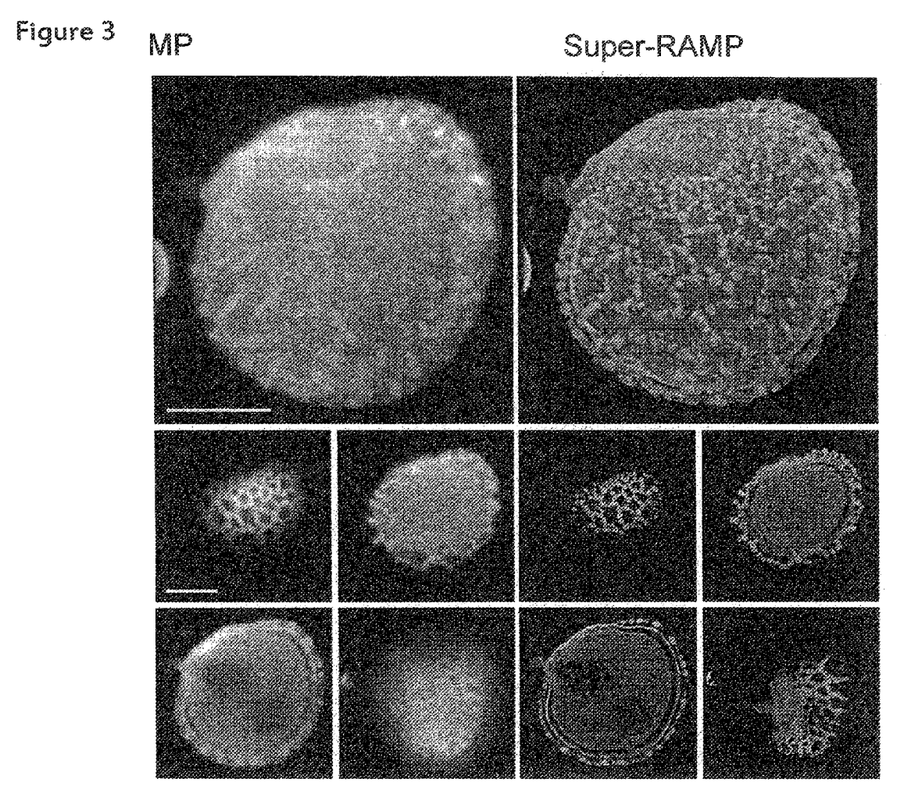
FIG. 3 provides a comparative illustration of the results achieved with the method of the present invention contrasted with those achieved by prior art methods.

Turning now to FIG. 3, the upper images show maximum projections of a pollen grain comparing standard multiphoton images (left) and equivalent composite images generated according to the method of the present invention (right). Shown immediately below for comparison are sections taken at various depths (7 µm, 19 µm, 37 µm & 63 µm) using standard multi-photon images (left) and equivalent composite images generated according to the method of the present invention (right). In the images of FIG. 3, the horizontal and vertical scale bars shown each represent 20 µm. As can be seen there is a clear increase in image resolution achieved by the present invention when compared to standard multi-photon imaging techniques.

Figure 4A:
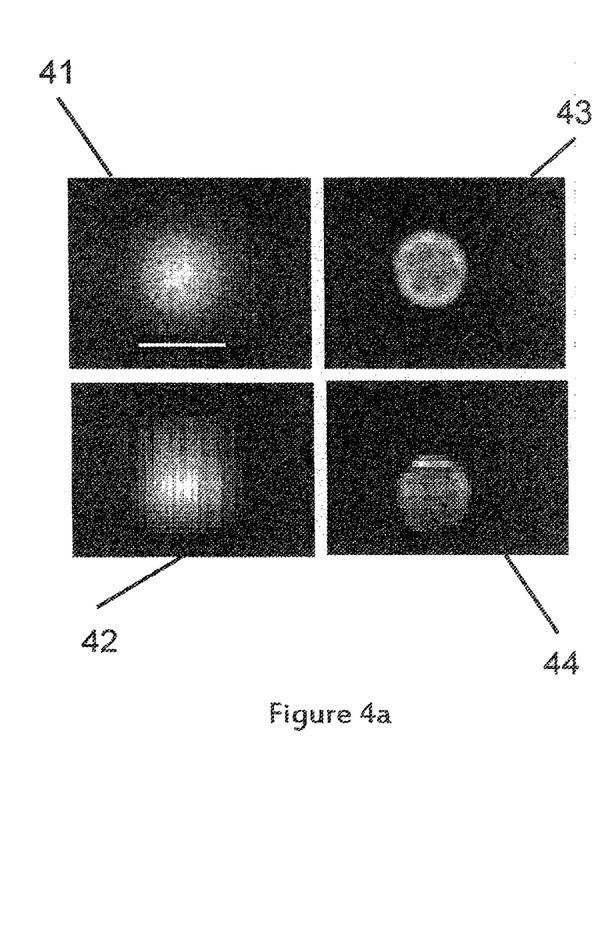
FIGS. 4*a*-4*b* provide a comparative illustration of the increased axial resolution in the results achieved using the methods and apparatus of the present invention.

FIG. 4a provides an illustration of how the images obtained using prior art methods 41, 42 compare with equivalent images generated according to the method of the present invention 43, 44. The images 41, 43 show a top-down perspective view of the object imaged. The images 42, 44 show a side perspective view of the object imaged. As can be seen there is a clear increase in the lateral and axial resolution of the image achieved by the present invention when compared to standard multi photon imaging techniques.

Figure 4B:
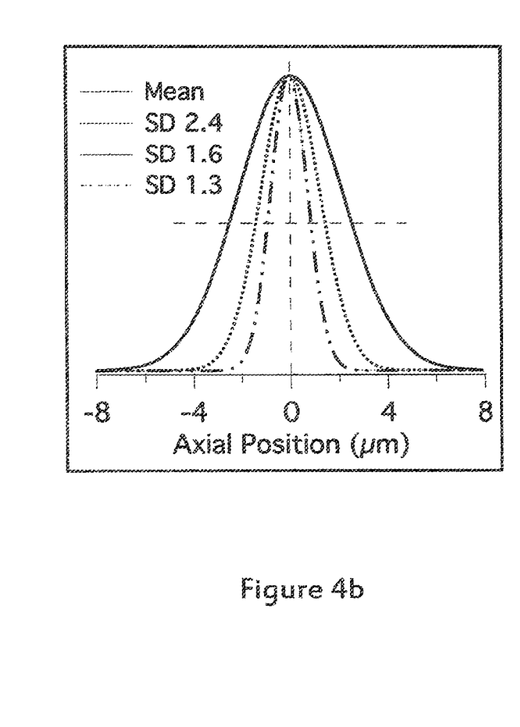

FIG. 4b shows a quantitative illustration of the increase in resolution obtained when applying Gaussian masks of varying standard deviation. Values below the dotted line show super-resolution. Gaussian masks with SDs ranging from 5 pixels to 0.2 pixels were examined. It is shown that the full width at half-maximum (FWHM) decreases with a reduction in the standard deviation (SD) of the Gaussian mask applied. A narrower FWHM correlates to an improved resolution and a 2.8 fold improvement in axial resolution is produced compared to standard multi photon imaging techniques. This pattern is observed when reducing the SD value to 1.6.

Figure 5A:
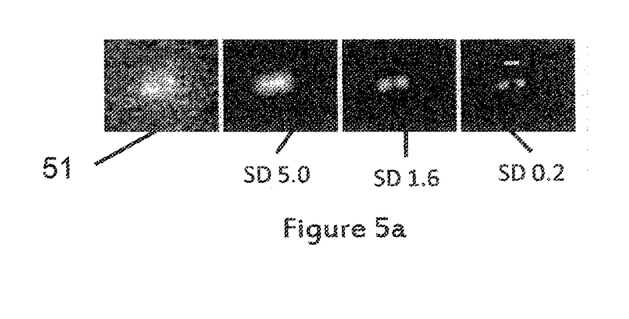
FIGS. 5*a*-5*c* provide a comparative illustration of the increase in lateral resolution in the results achieved using the methods and apparatus of the present invention.

Turning to FIG. 5a, it can be seen that the image achieved by prior art techniques 51 has a poorer resolution than the image achieved after the application of various Gaussian masks 52, 53, 54. Decreasing the SD value of the Gaussian mask produced a marked increase in lateral resolution. This can be seen by reviewing the image obtained by prior art techniques and noting that two separate bright spots cannot be identified whereas upon the application of a Gaussian mask, they can.

Figure 5B:
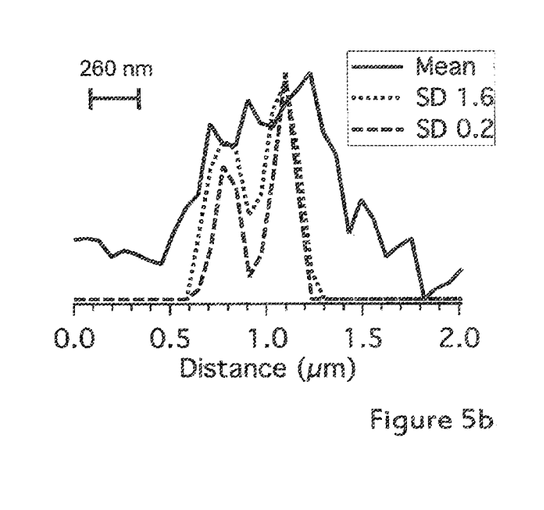
Figure 5C:
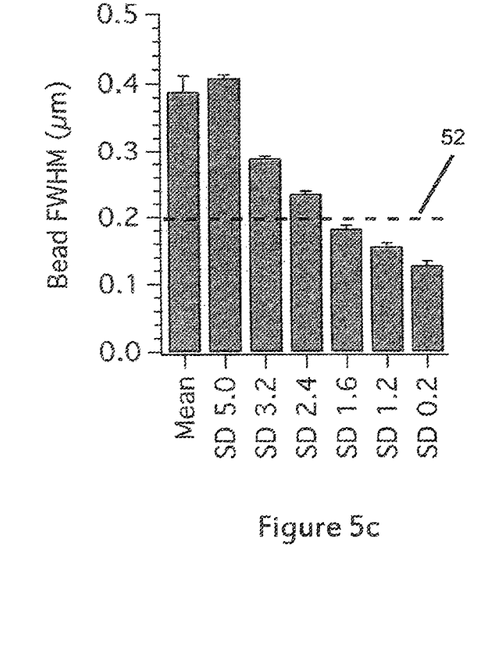

FIGS. 5b and 5c show a quantitative illustration of the increased resolution achieved by the present invention. FIG. 5b shows a profile across the corresponding images shown in FIG. 5a. It is seen that in the profile across the image obtained by prior art techniques 51 only shows the presence of a single peak, i.e. one object. The profiles across the images achieved after applying a Gaussian mask shows two separate peaks and hence the identification of two objects in the image. The FWHM of the profiles obtained reduce with decreasing SD values. This is illustrated further in FIG. 5a where two bright spots can be more easily identified with lower SD values but are unidentifiable in the image achieved using prior art techniques 51.

FIG. 5c illustrates how the FWHM varies as a function of the SD value of the Gaussian mask applied. It can be seen that below SD values of 1.6, the FWHM is narrower than the theoretical limit (illustrated by dashed line 52). There is also provided a FWHM value obtained in images achieved by prior art techniques which is and it can be seen that there is a significant improvement in resolution (reduction in FWHM value) using Gaussian masks below an SD value of 5.0. It can also be seen that the lower the SD value, the greater the improvement in resolution and using Gaussian masks of SD value less than 1.6 can provide images with a resolution greater than the theoretical limit.

Whilst the images in the examples above were generated using emission spots at a single wavelength, it is also possible to implement multicolour imaging. This is of particular use where a sample has relatively broad absorption or emission spectra or where two or more fluorescent substances with differing absorbtion or emission spectra are used simultaneously. In order to achieve two colour imaging with two emission wavelengths, filters may be used. Alternatively and preferably, an emission splitter (not shown) may be used to separate each emission colour onto separate regions of camera 14. In this context, sCMOS cameras are particularly suitable due to their large chip size.

Multicolour image alignment is made easier with super resolution imaging according to the present invention (Super-RAMP) because the two or more colour images are collected simultaneously but they still have to be separated and aligned accurately. The present invention can operate between ~750 and 920 nm which is within the range for activation of a large range of fluorophores including fluorescent proteins. Therefore, it is possible to distinguish multiple fluorophores either by changing the activation wavelength or by separating on the basis of emission wavelength.

Figure 6:
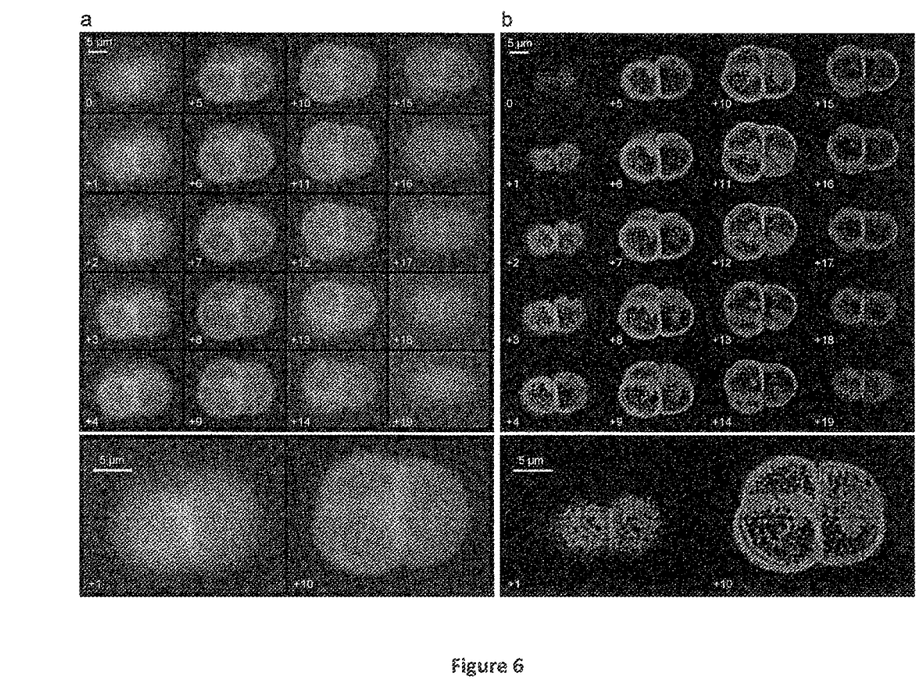
FIGS. 6*a*-6*b* illustrate the use of the imaging method of the present invention to generate images using emissions at two different wavelengths.

Turing now to FIGS. 6a and 6b, two colour imaging according to the present invention is illustrated. A pollen grain was activated at 780 nm and emission wavelengths of 505-540 nm and 690-740 nm collected simultaneously on an sCMOS camera. Sections were taken over an axial distance of 20 µm. Green and red pairs of images at each position were constructed and then split, aligned and merged using identical settings. Standard multiphoton images are shown in panel a) and images obtained using the present invention are shown in panel b). The scale bar represents 5 µm. Underneath are examples of images taken at z positions 1 and 10 µm.

Whilst the above example relates to a single activation wavelength and multiple emission wavelengths, it is also possible for the present invention to use multiple activation wavelengths for single colour or multicolour imaging.

The method may be used to monitor variation in specimens due to the application of differing conditions (including but not limited to variations in temperature, chemical exposure, electrical or magnetic stimulation or the like). This can be achieved by using fluorescent sensors or fluorescent compounds that alter their fluorescent properties dynamically, such as fluorescent calcium, voltage or pH sensors and generating images of specimens obtained under these differing conditions and comparing said images. Typically, this would involve subtracting one image from the other or comparing images collected simultaneously with a spectrally distinct reference fluorophore that was unresponsive to the sensed compound.

It is also possible for individual images within a sequence used to generate a composite images to be compared. This can allow temporal variation within the imaged sample to be monitored. Where composite images generated under differing conditions are compared, individual images within each sequence may be compared to illustrate the different temporal variations caused by the differing conditions.

Figure 7:
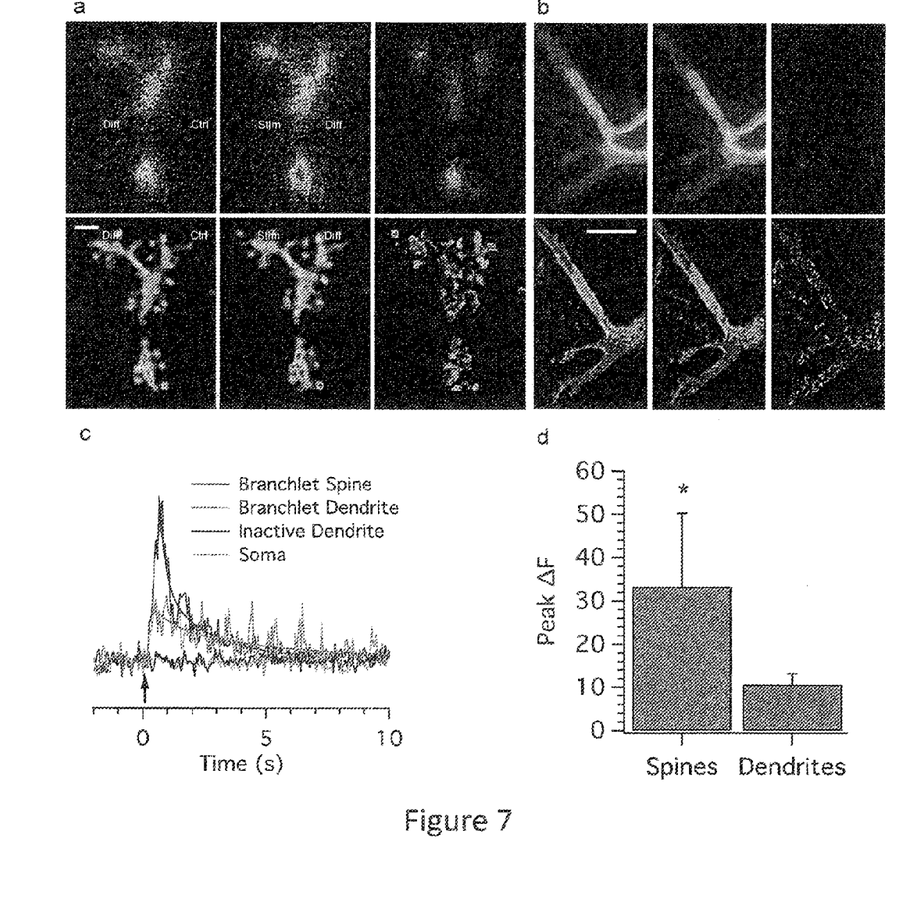
FIGS. 7*a*-7*d* provide an illustration of the use of the present invention to investigate temporal variation within an imaged area.

Turning now to FIG. 7a-7d, an example of comparing images generated under differing initial conditions is shown. In FIG. 7a, the specimen is a whole cell, patch clamped and filled with a fluorescent calcium indicator. Subsequently, pairs of concurrent image stacks were generated using the method of the present invention to illustrate the effects of stimulation and difference images produced to show the spatial changes in calcium-dependent fluorescence.

No electrical stimulation was applied during the first control stack (Ctrl). A burst of 10 stimuli (Stim) was applied during the second. Mean projections (top) and images according to the present invention (bottom) were constructed and the images before and during stimulation subtracted to show the difference in fluorescence (Diff). The scale bar represents 2 µm. The images obtained using the present invention revealed clear spines, spine necks and underlying dendrites and that increases in fluorescence were largely restricted to spine heads.

In FIG. 7b, equivalent images to FIG. 7a are shown for an area including the soma and proximate dendrite where no calcium response was observed. The scale bar represents 10 µm.

The images obtained using the present invention in FIGS. 7a and 7b enable the identification of the precise location of spines, underlying dendrite as well as inactive regions including distant dendrites and the soma. For example, the standard multiphoton images in FIG. 7b illustrate generalised increases in calcium in both spiny and dendritic regions although it is not possible to establish precisely where the changes occurred. These images clearly illustrate that increases occurred in predominantly in spines. Moreover, the enhanced lateral and axial resolution provided by the images according to the present invention revealed that calcium increases that appeared to originate from the dendrite actually came from spines that were protruding above the dendrite.

As shown in FIG. 7c it is possible to extract measurements of the change in calcium over time from clearly identified spines or underlying dendrites. Measurements were obtained from regions of interest placed over identified spines and dendrites and changes in fluorescence in the absence of stimulation subtracted from those taken during stimulation, the resulting difference plotted over time. As successive frames used to generate the images in the present invention were taken at 60 ms intervals, a temporal measurement of calcium over time at a rate of 16.6 data points per second can be obtained. As illustrated by FIG. 7d, the peak increase from active spines was significantly bigger than that from supporting dendrites (*$P<0.05$; Students t test).

The above embodiments are described by way of example only. Many variations are possible without departing from the scope of the invention as defined in the appended claims.

REFERENCES

1. Abbe, E. Beitrage zur Theorie des Mikroskops and der mikroskopischen Wahrnehmung. Arch. f. Mikroskop. Anat. 9, 413-468 (1873).
2. Betzig, E. et al. Imaging intracellular fluorescent proteins at nanometer resolution. Science 313, 1642-1645 (2006).
3. Hess, S. T., Girirajan, T. P. & Mason, M. D. Ultra-high resolution imaging by fluorescence photoactivation localization microscopy. Biophys J 91, 4258-4272 (2006).
4. Rust, M. J., Bates, M. & Zhuang, X. Sub-diffraction-limit imaging by stochastic optical reconstruction microscopy (STORM). Nat Methods 3, 793-795 (2006).
5. Jones, S. A., Shim, S. H., He, J. & Zhuang, X. Fast, three-dimensional super-resolution imaging of live cells. Nat Methods 8, 499-508 (2011).
6. Hell, S. W. & Wichmann, J. Breaking the diffraction resolution limit by stimulated emission: stimulated-emission-depletion fluorescence microscopy. Opt Lett 19, 780-782 (1994).
7. Ding, J. B., Takasaki, K. T. & Sabatini, B. L. Suprareso-lution imaging in brain slices using stimulated-emission depletion two-photon laser scanning microscopy. Neuron 63, 429-437 (2009).
8. Gustafsson, M. G. Surpassing the lateral resolution limit by a factor of two using structured illumination microscopy. Journal of microscopy 198, 82-87 (2000).
9. York, A. G. et al. Resolution doubling in live, multicellular organisms via multifocal structured illumination microscopy. Nat Methods 9, 749-754 (2012).
10. Serge, A., Bertaux, N., Rigneault, H. & Marguet, D. Dynamic multiple-target tracing to probe spatiotemporal cartography of cell membranes. Nat Methods 5, 687-694 (2008).
11. Dedecker, P., Duwe, S., Neely, R. K. & Zhang, J. Localizer: fast, accurate, open-source, and modular software package for superresolution microscopy. Journal of biomedical optics 17, 126008 (2012).

The invention claimed is:

1. A method of processing images captured following structured illumination of a sample, the method comprising the steps of:
    identifying emission spots within each captured image;
    verifying the emission spots;
    determining the centre of each identified spot;
    extracting a subimage concentric with each identified spot;
    enhancing each subimage;
    replacing the extracted subimages with the enhanced subimages and
    reconstructing an enhanced image of the sample from the emission spots wherein the reconstructing includes generating the enhanced image comprising the enhanced subimages.

2. A method as claimed in claim 1 wherein the step of identifying emission spots comprises iteratively fitting multiple point spread functions to regions of image data which appear to contain overlapping signals.

3. A method as claimed in claim 1, wherein the step of identifying emission spots comprises the steps of:
    extracting emission spot co-ordinates from potentially overlapping image data by first calculating the expected image from each possible emission spot position; and
    determining the emission spot positions that give rise to real signals in light of this complete prior knowledge.

4. A method as claimed in claim 1, wherein the step of reconstructing an enhanced image comprises the steps of calculating a 2D histogram of the emission spot positions with a chosen square bin size, which may correspond to the pixel size of the composite image; and displaying the histogram as a pixelated image whose local intensity is proportional to the bin occupancy.

5. A method as claimed in claim 1, wherein the step of reconstructing an enhanced image comprises forming a Quad-Tree Based Adaptive Histogram based on a quad-tree representation of the localization data.

6. A method as claimed in claim 5, wherein the method includes the further step of selecting the axial focus of the images by selecting the PSF diameter and/or threshold value.

7. A method according to claim 1, wherein only in focus spots, are identified and processed, wherein in focus spots are identified if their diameters match the diameter of the expected point spread function (PSF) of the collection optics.

8. A method according to claim 1, wherein spots are identified using a generalised likelihood ratio test (GLRT) segmentation method based on spot diameter and signal to noise ratio.

9. A method as claimed in claim 1, wherein the centre of each identified spot is determined by using nonlinear curve fitting of a symmetric Gaussian function with a fixed standard deviation.

10. A method as claimed in claim 1, wherein subimage enhancement is carried out using a Gaussian mask or scaling the subimage.

11. A method as claimed in claim 1, wherein the method includes the further step of generating a composite image from a sequence of enhanced images.

12. A method as claimed in claim 11 wherein the method includes the additional steps of generating composite images under differing conditions and comparing said composite images.

13. A method as claimed in claim 11 wherein the method includes the steps of comparing emissions spots at said selected locations over the sequence of images used to generate a composite image.

14. A super-resolution imaging method comprising the steps of:
    selectively illuminating a series of separated points of a specimen;
    capturing images resulting from said illumination; and
    processing said images according to the method of claim 1.

15. A method as claimed in claim 14, wherein the illuminated spots are arranged according to a grid pattern determined iteratively.

16. A method as claimed in claim 14, wherein each illumination pattern is used to generate an enhanced image.

17. A method as claimed in claim 16 wherein the method includes the further step of generating a composite image from a sequence of enhanced images, wherein the number of images in the sequence is related to the number of illumination points in an illumination pattern.

18. An apparatus for super-resolution imaging, the apparatus comprising:

a programmable illumination arrangement operable to selectively illuminate a series of separated points of a specimen;

a detection arrangement operable to capture images resulting from said illumination; and processing means operable to process the captured images by identifying emission spots within each captured image;

verifying the emission spots;

determining the centre of each identified spot;

extracting a subimage concentric with each identified spot;

enhancing each subimage;

replacing the extracted subimages with the enhanced subimages; and reconstructing an enhanced image of the specimen from the emission spots wherein the reconstructing includes generating the enhanced image comprising the enhanced subimages.

19. An apparatus as claimed in claim 18, wherein the programmable illumination arrangement comprises:

a laser beam steering means including acousto-optic deflectors (AODs);

and compensation means including an acousto-optic modulator (AOM).

20. A method of processing images captured following structured illumination of a sample, the method comprising the steps of:

identifying emission spots within each captured image;

determining a centre of each identified emission spot;

extracting a subimage concentric with the centre of each identified emission spot;

enhancing each subimage;

replacing each extracted subimage with the corresponding enhanced subimage to form an enhanced image for each captured image; and generating a composite enhanced image of the sample by combining the enhanced images.

21. The method of claim 1, wherein the sample comprises a uniformly fluorescent specimen, and wherein the method further comprises storing locations of the emission spots as a reference.

* * * * *